(12) United States Patent
Hasegawa et al.

(10) Patent No.: US 12,157,923 B2
(45) Date of Patent: Dec. 3, 2024

(54) HIGH-STRENGTH HOT-DIP GALVANIZED STEEL SHEET AND METHOD FOR PRODUCING THE SAME

(71) Applicant: JFE Steel Corporation, Tokyo (JP)

(72) Inventors: Hiroshi Hasegawa, Tokyo (JP); Hidekazu Minami, Tokyo (JP); Tatsuya Nakagaito, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 778 days.

(21) Appl. No.: 17/417,865

(22) PCT Filed: Aug. 23, 2019

(86) PCT No.: PCT/JP2019/033081
§ 371 (c)(1),
(2) Date: Jun. 24, 2021

(87) PCT Pub. No.: WO2020/136989
PCT Pub. Date: Jul. 2, 2020

(65) Prior Publication Data
US 2022/0098687 A1 Mar. 31, 2022

(30) Foreign Application Priority Data
Dec. 26, 2018 (JP) .................................. 2018-242711

(51) Int. Cl.
| | | |
|---|---|---|
| *C21D 9/46* | (2006.01) | |
| *C21D 8/02* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/38* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/54* | (2006.01) | |
| *C22C 38/60* | (2006.01) | |
| *C23C 2/02* | (2006.01) | |
| *C23C 2/06* | (2006.01) | |
| *C23C 2/28* | (2006.01) | |
| *C23C 2/40* | (2006.01) | |
| *C23G 1/02* | (2006.01) | |
| *C21D 9/00* | (2006.01) | |

(52) U.S. Cl.
CPC ............. *C21D 9/46* (2013.01); *C21D 8/0226* (2013.01); *C21D 8/0236* (2013.01); *C21D 8/0263* (2013.01); *C21D 8/0273* (2013.01); *C21D 8/0278* (2013.01); *C22C 38/002* (2013.01); *C22C 38/005* (2013.01); *C22C 38/02* (2013.01); *C22C 38/04* (2013.01); *C22C 38/06* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/60* (2013.01); *C23C 2/02* (2013.01); *C23C 2/0224* (2022.08); *C23C 2/024* (2022.08); *C23C 2/06* (2013.01); *C23C 2/28* (2013.01); *C23C 2/29* (2022.08); *C23C 2/40* (2013.01); *C23G 1/02* (2013.01); *C21D 2211/001* (2013.01); *C21D 2211/002* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 10,982,297 | B2 | 4/2021 | Ono et al. |
| 2013/0048151 | A1 | 2/2013 | Kawamura et al. |
| 2019/0153575 | A1 | 5/2019 | Shibata et al. |
| 2019/0203317 | A1 | 7/2019 | Yoshioka et al. |

(Continued)

FOREIGN PATENT DOCUMENTS

| | | |
|---|---|---|
| CN | 106661658 A | 5/2017 |
| EP | 2762603 A1 | 8/2014 |
| EP | 3054025 A1 | 8/2016 |
| EP | 3173494 A1 | 5/2017 |
| EP | 3219821 A1 | 9/2017 |
| JP | 5884210 B1 | 3/2016 |

(Continued)

OTHER PUBLICATIONS

International Search Report and Written Opinion for International Application No. PCT/JP2019/033081, dated Nov. 26, 2019, 4 pages.

(Continued)

*Primary Examiner* — Lois L Zheng
(74) *Attorney, Agent, or Firm* — Buchanan Ingersoll & Rooney PC

(57) ABSTRACT

A high-strength hot-dip galvanized steel sheet includes a hot-dip galvanized layer on a surface of the steel sheet and has a specific component composition and a steel microstructure containing, on an area percentage basis, 90% to 100% of martensite and carbide-containing bainite in total and 0% to 10% of retained austenite, and containing prior austenite grains having an aspect ratio of 2.0 or less, in a region extending from 300 μm to 400 μm from the surface layer, in which the ratio of the average amount of C at 5 μm from the surface layer to the average amount of C at 70 μm from the surface layer is 0.2 to 0.8, and the ratio of the standard deviation of the amount of C to the average amount of C in a region extending from 300 μm to 400 μm from the surface layer is 0.40 or less.

8 Claims, No Drawings

(56) References Cited

U.S. PATENT DOCUMENTS

2020/0032364 A1  1/2020  Hirashima et al.
2020/0299797 A1  9/2020  Kohsaka et al.

FOREIGN PATENT DOCUMENTS

| KR | 20170086653 A | | 7/2017 | |
|---|---|---|---|---|
| KR | 10-2018-0120712 | * | 11/2018 | ............ C22C 38/04 |
| WO | 2011105385 A1 | | 9/2011 | |
| WO | 2015185975 A1 | | 12/2015 | |
| WO | 2016129550 A1 | | 8/2016 | |
| WO | 2017169869 A1 | | 10/2017 | |
| WO | 2018055425 A1 | | 3/2018 | |
| WO | 2018062380 A1 | | 4/2018 | |
| WO | 2018062381 A1 | | 4/2018 | |
| WO | 2018146828 A1 | | 8/2018 | |

OTHER PUBLICATIONS

Korean Written Decision on Registration for Korean Application No. 10-2021-7019656, dated Apr. 8, 2023 with translation, 4 pages.
Extended European Search Report for European Application No. 19906059.1, dated Nov. 2, 2021, 11 pages.
Chinese Office Action with Search Report for Chinese Application No. 201980086542.6, dated Apr. 27, 2022, 8 pages.

* cited by examiner

HIGH-STRENGTH HOT-DIP GALVANIZED STEEL SHEET AND METHOD FOR PRODUCING THE SAME

CROSS REFERENCE TO RELATED APPLICATIONS

This is the U.S. National Phase application of PCT/JP2019/033081, filed Aug. 23, 2019 which claims priority to Japanese Patent Application No. 2018-242711, filed Dec. 26, 2018, the disclosures of these applications being incorporated herein by reference in their entireties for all purposes.

FIELD OF THE INVENTION

The present invention relates to a high-strength hot-dip galvanized steel sheet suitable for automotive components and a method for producing the high-strength hot-dip galvanized steel sheet.

BACKGROUND OF THE INVENTION

From the viewpoint of improving the crashworthiness and the fuel economy of automobiles, steel sheets used for automotive components are required to have higher strength. Such automotive components are exposed to a corrosive environment; thus, the demand for high rusting resistance is also increasing. However, in the case of components exposed to a corrosive environment, an increase in strength may lead to delayed fracture due to hydrogen penetration from the environment, which has been a major obstacle to the increase in strength. In particular, in components having sheared edge surfaces, it is important to suppress delayed fracture starting from sheared edge surfaces. Thus, a coated steel sheet having high strength and excellent in delayed fracture resistance is required. As coated steel sheets excellent in delayed fracture properties, Patent Literatures 1 and 2 disclose steel sheets in which the amounts, shapes, and distributions of inclusions therein are controlled.

PATENT LITERATURE

PTL 1: Japanese Unexamined Patent Application Publication (Translation of PCT Application) No. 2018-62380
PTL 2: Japanese Unexamined Patent Application Publication (Translation of PCT Application) No. 2018-62381

SUMMARY OF THE INVENTION

In Patent Literatures 1 and 2, however, controlling inclusions and controlling microstructures at micrometer levels are main subjects, and an improvement in delayed fracture resistance by controlling a C distribution at a nanoscale level or controlling the shape of grains is not disclosed. A deterioration in delayed fracture properties depending on the state of a shearing blade is also not disclosed. Aspects of the present invention have been made in light of the above-mentioned problems and aim to provide a high-strength hot-dip galvanized steel sheet having high strength and excellent in delayed fracture resistance from a sheared edge surface and a method for producing the high-strength hot-dip galvanized steel sheet.

The inventors have conducted intensive studies and have found the following: Delayed fracture from a sheared edge surface is greatly affected by the formation of the sheared edge surface. The properties of delayed fracture starting from a sheared edge surface formed in a state in which a shearing blade is rounded to a radius of curvature of about 0.2 mm are significantly deteriorated. Moreover, even a steel sheet having a tensile strength (TS) of 1,300 to 1,750 MPa has excellent delayed fracture resistance from a sheared edge surface (hereinafter, also referred to as "edge cracking resistance") in the case where the steel sheet has a component composition containing, on a percent by mass basis, C: 0.12% to 0.35%, Si: 0.01% to 3.0%, Mn: 2.0% to 4.0%, P: 0.100% or less, S: 0.02% or less, and Al: 0.01% to 1.50%, the balance being Fe and incidental impurities, and a steel microstructure containing, on the basis of an area percentage that has been determined by microstructural observation at a position 300 to 400 μm from a surface layer of the steel sheet, 90% to 100% of martensite and carbide-containing bainite in total and 0% to 10% of retained austenite, and containing prior austenite grains having an aspect ratio of 2.0 or less, in which the ratio of the average amount of C at a position 5 μm from a surface layer of the steel sheet in the thickness direction to the average amount of C at a position 70 μm from the surface layer of the steel sheet in the thickness direction is 0.20 to 0.80, and the ratio of the standard deviation of the amount of C to the average amount of C when analysis is performed with an FE-EPMA in a region extending from a position 300 to a position 400 μm from the surface layer of the steel sheet in the thickness direction is 0.40 or less.

The term "high strength" used in accordance with aspects of the present invention indicates that TS is 1,300 MPa or more. The term "excellent resistance to sheared edge cracking" indicates that when a test piece is immersed in hydrochloric acid having a pH of 3 for 24 hours with a tensile stress of 1,000 MPa applied to the outside of its bend, the outside of the burr of the test piece having a sheared edge surface being the outside of the bend, no cracks having a size of 1 mm or more starting from an edge surface are formed on the surface of the bend. Here, the sheared edge surface refers to a sheared edge surface formed by shearing at a shear angle of 2°, a clearance of 15%, and a radius of curvature of a shearing blade of 0.2 mm or less. The shear angle is an angle formed by the shearing blade and a steel sheet.

Aspects of the present invention are based on the findings described above, and the gist thereof is described below.

[1] A high-strength hot-dip galvanized steel sheet includes a hot-dip galvanized layer on a surface of the steel sheet and has a component composition containing, on a percent by mass basis, C: 0.12% to 0.35%, Si: 0.01% to 3.0%, Mn: 2.0% to 4.0%, P: 0.100% or less (excluding 0), S: 0.02% or less (excluding 0), and Al: 0.01% to 1.50%, the balance being Fe and incidental impurities, and a steel microstructure containing, on an area percentage basis, 90% to 100% of martensite and carbide-containing bainite in total and 0% to 10% of retained austenite, and containing prior austenite grains having an aspect ratio of 2.0 or less, in a region extending from a position 300 μm to a position 400 μm from the surface layer of the steel sheet in the thickness direction, in which the ratio of the average amount of C at a position 5 μm from the surface layer of the steel sheet in the thickness direction to the average amount of C at a position 70 μm from the surface layer of the steel sheet in the thickness direction is 0.20 to 0.80, and the ratio of the standard deviation of the amount of C to the average amount of C when analysis is performed with a field emission-electron probe micro-analyzer (FE-EPMA) in a region extending from a position 300 μm to a position 400 μm from the surface layer of the steel sheet in the thickness direction is 0.40 or less.

[2] In the high-strength hot-dip galvanized steel sheet described in [1], the component composition further contains, on a percent by mass basis, one or more selected from Ti: 0.005% to 0.20%, Nb: 0.005% to 0.20%, V: 0.005% to 2.0%, and Mo: 0.005 to 2.0%.

[3] In the high-strength hot-dip galvanized steel sheet described in [1] or [2], the component composition further contains, on a percent by mass basis, one or more selected from Cr: 0.005% to 2.0%, Ni: 0.005% to 2.0%, Cu: 0.005% to 2.0%, B: 0.0002% to 0.0050%, Ca: 0.001% to 0.005%, a REM: 0.001% to 0.005%, Sn: 0.001% to 0.05%, and Sb: 0.001% to 0.05%.

[4] In the high-strength hot-dip galvanized steel sheet described in any one of [1] to [3], the hot-dip galvanized layer is a hot-dip galvannealed layer.

[5] A method for producing a high-strength hot-dip galvanized steel sheet includes subjecting a slab having the component composition described in any one of [1] to [3] to hot rolling, then cooling, and coiling at a temperature of 590° C. or lower to produce a hot-rolled steel sheet, subjecting the hot-rolled steel sheet to pickling, then performing heat treatment in an atmosphere in which $O_2 \leq 1\%$ by volume and $O_2/H_2$ 0.2 (ratio by vol %) under conditions where the maximum temperature reached is 400° C. to lower than 600° C. and where the maximum temperature reached and the holding time satisfy formula (1) described below, then performing cold rolling at a rolling reduction of 20% or more, subsequently performing annealing that includes heating to a temperature in the temperature range of Ac3 to 950° C., holding for 10 to 600 s at a dew point of −35° C. to +20° C. in this temperature range, then cooling to 550° C. at an average cooling rate of 3° C./s or more, and holding at 400° C. to 550° C. for 5 to 300 s, then performing hot-dip galvanizing treatment and, optionally, alloying treatment, and subsequently performing cooling to room temperature, $$18{,}500 > (273 + T_1) \times \text{Log}_{10}(t/3600) \tag{1}$$

where in formula (1), $T_1$ is the maximum temperature reached (° C.), and t is the holding time (s).

[6] In the method for producing a high-strength hot-dip galvanized steel sheet described in [5], regarding the cooling to room temperature after performing the hot-dip galvanizing treatment and, optionally, the alloying treatment, the cooling is performed so as to satisfy formula (2) below:

[Math. 1]

$$\sum_{T_2=50}^{Ms} \sqrt{\frac{0.004\exp(-9862/(T_2 + 273))}{C}} < 5.0 \times 10^{-8} \tag{2}$$

where in formula (2), $T_2$ is a temperature (° C.) in the range of 50° C. to an Ms temperature, and C is a cooling rate (° C./s) at $T_2$.

According to aspects of the present invention, the high-strength galvanized steel sheet suitable as a material for automotive components and excellent in edge cracking resistance can be obtained.

DETAILED DESCRIPTION OF EMBODIMENTS OF THE INVENTION

Embodiments of the present invention will be described below. The present invention is not limited to these embodiments. First, the component composition of a high-strength hot-dip galvanized steel sheet (hereinafter, also referred to as a "steel sheet") according to an embodiment will be described. In the description of the component composition, the symbol "%" used as the units of the element content refers to "% by mass".

C: 0.12% to 0.35%

C is an element effective in forming martensite and carbide-containing bainite to increase TS. A C content of less than 0.12% does not result in an effect of increasing TS, an increase in the strength of the steel sheet, or the steel microstructure of the steel sheet according to the embodiment. Accordingly, the C content needs to be 0.12% or more. The C content is preferably 0.13% or more. A C content of more than 0.35% results in harder martensite to deteriorate the delayed fracture resistance. Accordingly, the C content needs to be 0.35% or less. The C content is preferably 0.32% or less, more preferably 0.30% or less.

Si: 0.01% to 3.0%

Si is an element needed to increase TS by solid-solution strengthening and suppression of tempering of martensite and to obtain excellent delayed fracture resistance. To provide these effects, the Si content needs to be 0.01% or more. The Si content is preferably 0.1% or more, more preferably 0.2% or more. A Si content of more than 3.0% results in excessive formation of ferrite, thereby failing to obtain the steel microstructure of the steel sheet according to the embodiment. Accordingly, the Si content needs to be 3.0% or less. The Si content is preferably 2.5% or less, more preferably 2.0% or less.

Mn: 2.0% to 4.0%

Mn is an element effective in forming martensite and carbide-containing bainite to increase TS. To provide these effects, the Mn content needs to be 2.0% or more. The Mn content is preferably 2.1% or more, more preferably 2.2% or more. A Mn content of more than 4.0% results in embrittlement of steel, thereby failing to obtain the edge cracking resistance of the steel sheet according to the embodiment. Accordingly, the Mn content needs to be 4.0% or less. The Mn content is preferably 3.7% or less, more preferably 3.4% or less.

P: 0.100% or less (excluding 0)

P causes embrittlement of grain boundaries, thereby deteriorating the edge cracking resistance. Thus, the P content is desirably minimized. In the steel sheet according to the embodiment, the P content can be tolerated up to 0.100%. The lower limit of the P content need not be specified. To obtain a P content of the steel sheet of less than 0.0005%, a heavy load is applied to refining to deteriorate production efficiency. Thus, the lower limit of the P content is preferably 0.0005%.

S: 0.02% or less (excluding 0)

S increases inclusions to deteriorate the edge cracking resistance. Thus, the S content is desirably minimized. In the steel sheet according to the embodiment, the S content can be tolerated up to 0.02%. The lower limit of the S content need not be specified. To obtain a S content of the steel sheet of less than 0.0001%, a heavy load is applied to refining to deteriorate production efficiency. Thus, the lower limit of the S content is preferably 0.0001%.

Al: 0.01% to 1.50%

Al acts as a deoxidizing agent and thus is preferably added in a deoxidization step. To provide the effect, the Al content needs to be 0.01% or more. The Al content is preferably 0.015% or more. An Al content of more than 1.50% results in excessive formation of ferrite, failing to obtain the steel microstructure of the steel sheet according to the embodiment. Accordingly, the Al content needs to be 1.50% or less. The Al content is preferably 1.00% or less, more preferably 0.70% or less.

The steel sheet according to the embodiment may further contain one or more selected from elements described below, as needed.

Ti: 0.005% to 0.20%, Nb: 0.005% to 0.20%, V: 0.005% to 2.0%, and Mo: 0.005% to 2.0%

Ti, Nb, V, and Mo are elements effective in forming fine carbides to increase the strength. To provide the effect, one or more selected from Ti, Nb, V, and Mo are preferably contained in amounts of the above-mentioned lower limits or more. When the amounts of these contained are more than the respective upper limits, the amount of carbon dissolved in steel is decreased to form a large amount of ferrite, thus possibly failing to obtain the steel microstructure of the steel sheet. Accordingly, the amounts of one or more selected from Ti, Nb, V, and Mo are preferably as follows: Ti: 0.005% or more and 0.20% or less, Nb: 0.005% or more and 0.20% or less, V: 0.005% or more and 2.0% or less, and Mo: 0.005% or more and 2.0% or less.

Cr: 0.005% to 2.0%, Ni: 0.005% to 2.0%, Cu: 0.005% to 2.0%, B: 0.0002% to 0.0050%, Ca: 0.001% to 0.005%, REM: 0.001% to 0.005%, Sn: 0.001% to 0.05%, and Sb: 0.001% to 0.05%

Cr, Ni, and Cu are elements effective in forming martensite and bainite to increase the strength. To provide these effects, the amount of each of Cr, Ni, and Cu contained is preferably 0.005% or more. When the amount of each of Cr, Ni, and Cu contained is more than 2.0%, a large amount of retained $\gamma$ is formed, thereby possibly failing to obtain the steel microstructure of the steel sheet. For this reason, the amount of each of Cr, Ni, and Cu is preferably 2.0% or less.

B is an element effective in enhancing the hardenability of the steel sheet and forming martensite and bainite to increase the strength. To provide these effects, the B content is preferably 0.0002% or more. A B content of more than 0.0050% may result in the increase of inclusions to deteriorate the edge cracking resistance. For this reason, the B content is preferably 0.0050% or less.

Ca and REMs are elements effective in shape control of inclusions to improve the edge cracking resistance. To provide these effects, the amount of each of Ca and REMs is preferably 0.001% or more. When the amount of each of Ca and REMs is more than 0.005%, the amounts of inclusions are increased to deteriorate the edge cracking resistance. For this reason, the amount of each of Ca and REMs is preferably 0.005% or less.

Sn and Sb are elements effective in suppressing, for example, denitrization and deboronization to suppress a decrease in the strength of the steel sheet. To provide these effects, the amount of each of Sn and Sb contained is preferably 0.001% or more. When the amount of each of Sn and Sb contained is more than 0.05%, the distribution of the amount of C near a surface layer of the steel sheet may fail to be obtained. For this reason, the amount of each of Sn and Sb is preferably 0.05% or less.

Accordingly, one or more selected from Cr, Ni, Cu, B, Ca, REMs, Sn, and Sb are preferably as follows: Cr: 0.005% to 2.0%, Ni: 0.005% to 2.0%, Cu: 0.005% to 2.0%, B: 0.0002% to 0.0050%, Ca: 0.001% to 0.005%, a REM: 0.001% to 0.005%, Sb: 0.001% to 0.05%, and Sn: 0.001% to 0.05%.

The steel sheet according to the embodiment has the above-mentioned component composition, and the balance other than the component composition contains Fe (iron) and incidental impurities. The balance is preferably Fe and incidental impurities. When the above-mentioned optional components are contained in amounts of less than the respective lower limits, these optional components are regarded as incidental impurities. N may be contained in an amount of 0.01% or less as an incidental impurity. Moreover, Zr, Mg, La, and Ce, which are other elements, may be contained in a total amount of 0.002% or less.

Ratio of Average Amount of C at Position 5 μm from Surface Layer of Steel Sheet in Thickness Direction to Average Amount of C at Position 70 μm from Surface Layer of Steel Sheet in Thickness Direction: 0.20 to 0.80

In the steel sheet according to the embodiment, the distribution of the amount of C near a surface layer of the steel sheet is significantly important. In the case where the amount of C at the closer position to the surface layer of the steel sheet is the smaller and where the ratio of the amounts of C in a region from the surface layer to a position 70 μm from the surface layer is within a certain range, the formation of cracks near the surface layer of the edge surface is suppressed to obtain excellent edge cracking resistance. Accordingly, the ratio of the average amount of C at a position 5 μm from the surface layer of the steel sheet in the thickness direction to the average amount of C at a position 70 μm from the surface layer of the steel sheet in the thickness direction needs to be 0.20 or more and 0.80 or less. The ratio of the average amount of C at the position 5 μm from the surface layer of the steel sheet in the thickness direction to the average amount of C at the position 70 μm from the surface layer of the steel sheet in the thickness direction is preferably 0.25 or more. The ratio of the average amount of C at the position 5 μm from the surface layer of the steel sheet in the thickness direction to the average amount of C at the position 70 μm from the surface layer of the steel sheet in the thickness direction is preferably 0.70 or less, more preferably 0.60 or less. The surface layer of the steel sheet refers to the interface between the hot-dip galvanized layer and the steel sheet. The ratio of the average amount of C at the position 5 μm from the surface layer of the steel sheet in the thickness direction to the average amount of C at the position 70 μm from the surface layer of the steel sheet in the thickness direction is calculated by dividing the average amount of C at the position 5 μm in the thickness direction by the average amount of C at the position 70 μm from the surface layer of the steel sheet in the thickness direction. That is, the ratio of the average amount of C at the position 5 μm from the surface layer of the steel sheet in the thickness direction to the average amount of C at the position 70 μm from the surface layer of the steel sheet in the thickness direction can be calculated from formula (3) described below.

$$\text{(Average amount of C at position 5 μm from surface layer of steel sheet in thickness direction)/(average amount of C at position 70 μm from surface layer of steel sheet in thickness direction)} \qquad (3)$$

The ratio of the average amount of C at the position 5 μm from the surface layer of the steel sheet in the thickness direction to the average amount of C at the position 70 μm from the surface layer of the steel sheet in the thickness direction is measured by glow discharge optical emission spectrometry (GDS). The galvanized layer is removed, for example, by pickling with hydrochloric acid to expose a surface layer of the steel sheet. Subsequently, the surface of the steel sheet is subjected to measurement by GDS using Ar as plasma gas at a gas pressure of 600 Pa, a high-frequency output of 35 W, and measurement intervals of 0.1 s. The measurement is performed from the surface to a depth of 80 μm or more, and the ratio of the detected intensity of C at a sputtering time corresponding to a depth of 5 μm to the detected intensity of C at a sputtering time corresponding to a depth of 70 μm is determined.

Ratio of Standard Deviation of Amount of C to Average Amount of C when Analysis is Performed with FE-EPMA in Region Extending from Surface Layer of Steel Sheet to Position 300 to 400 μm from Surface Layer of Steel Sheet in Thickness Direction: 0.40 or Less In the steel sheet according to the embodiment, variations in the amount of C in a very small area of the steel sheet significantly deteriorate the edge cracking resistance. Thus, the ratio of the standard deviation of the amount of C to the average amount of C when analysis is performed with a FE-EPMA is significantly important. A ratio of 0.40 or less results in excellent edge cracking resistance. Accordingly, in the region extending from the surface layer of the steel sheet to the position 300 to 400 μm from the surface layer of the steel sheet in the thickness direction, the ratio of the standard deviation of the amount of C to the average amount of C when analysis is performed with the FE-EPMA needs to be 0.40 or less. In the region extending from the surface layer of the steel sheet to the position 300 to 400 μm from the surface layer of the steel sheet in the thickness direction, the ratio of the standard deviation of the amount of C to the average amount of C when analysis is performed with the FE-EPMA is preferably 0.36 or less, more preferably 0.32 or less.

The ratio of the standard deviation of the amount of C to the average amount of C when analysis is performed with the FE-EPMA in the region extending from the surface layer of the steel sheet to the position 300 to 400 μm from the surface layer of the steel sheet in the thickness direction can be calculated from formula (4) below.

(Standard deviation of amount of C in region extending from surface layer of steel sheet to position 300 to 400 μm from surface layer of steel sheet in thickness direction)/(average amount of C in region extending from surface layer of steel sheet to position 300 to 400 μm from surface layer of steel sheet in thickness direction)   (4)

The measurement conditions for the FE-EPMA include an acceleration voltage of 9.0 kV, a beam current of $7.0 \times 10^{-8}$ A, and a measurement pitch of 0.065 μm. The average amount of C measured with the FE-EPMA and the amount of C in steel measured by a combustion method shall agree with each other within ±20%. The surface layer of the steel sheet refers to the interface between the hot-dip galvanized layer and the steel sheet.

Next, the steel microstructure of the steel sheet according to the embodiment will be described. The steel sheet according to the embodiment contains, on an area percentage basis, 90% to 100% of martensite and carbide-containing bainite in total and 0% to 10% of retained austenite, and contains prior austenite grains having an aspect ratio of 2.0 or less in a region extending from the surface layer of the steel sheet to the position 300 to 400 μm from the surface layer of the steel sheet in the thickness direction.

Total of Martensite and Carbide-Containing Bainite: 90% to 100%

Martensite and carbide-containing bainite are microstructure components needed to increase TS and achieve excellent edge cracking resistance. To provide these effects, the total of martensite and carbide-containing bainite needs to be 90% or more on an area percentage basis. The total of martensite and carbide-containing bainite is preferably 92% or more, more preferably 94% or more. The upper limit of the total of martensite and carbide-containing bainite is 100%.

Retained Austenite: 0% to 10%

Retained austenite may be contained in order to improve ductility and so forth, but is desirably minimized because variations in the amount of C thereby are more likely to occur. In the steel sheet according to the embodiment, retained austenite is tolerated up to 10% on an area percentage basis. Accordingly, retained austenite needs to be 10% or less on an area percentage basis. Retained austenite is preferably 8% or less, more preferably 6% or less. The lower limit of retained austenite is 0%.

Aspect Ratio of Prior Austenite Grain: 2.0 or Less

A larger aspect ratio of the prior austenite grains results in promotion of crack propagation from an edge, thereby deteriorating the edge cracking resistance. Accordingly, the prior austenite grains need to have an aspect ratio of 2.0 or less.

In the steel sheet according to the embodiment, basically, ferrite, carbide-free bainite, and pearlite are not preferred; thus, the total amount thereof is desirably 5% or less on an area percentage basis.

The area percentages of carbide-containing bainite and martensite in the embodiment refer to area fractions of the respective microstructure components with respect to an observation area. These area percentages are determined as follows: A sample is cut from an annealed steel sheet. A section of the steel sheet in the thickness direction and parallel to the rolling direction is polished and then etched with 1% by mass nital. Images are acquired from 3 to 10 fields of view in each of a region in the vicinity of a surface of the steel sheet and a region extending from a position 300 μm to a position 400 μm from the surface of the steel sheet in the thickness direction with a scanning electron microscope (SEM) at a magnification of 1,500×. The area percentages of the respective microstructure components are determined from the resulting image data by using Image-Pro, available from Media Cybernetics, Inc. The average of the area percentages determined from the fields of view is defined as the area percentage of each of the microstructure components.

In the image data, carbide-containing bainite appears as a gray or dark-gray region containing aligned carbide particles in an amount of $10^7$ pieces/mm$^2$ or more and thus is distinguishable. Martensite appears as a dark-gray, gray, or light-gray region containing carbide particles that are not aligned, or appears as a carbide-free white block, and thus is distinguishable. Retained austenite also appears white, but is distinguishable from martensite by a method described below. Carbides appear as white dots or lines and thus are distinguishable. Ferrite and carbide-free bainite appear black or dark gray and thus are distinguishable. Pearlite, which is basically not contained in the steel sheet according to the embodiment, appears as a black and white layered microstructure component and thus is distinguishable.

The aspect ratio of the prior austenite grains is determined as follows: A sample cut out in the same manner as described above is heat-treated at 600° C. for 10 minutes. A section of the sample in the thickness direction and parallel to the rolling direction is polished, immersed in an aqueous solution of picric acid, and etched with an aqueous solution of ferric chloride to expose prior austenite grain boundaries. Images are acquired from 3 to 10 fields of view in a region extending from a position 300 μm to a position 400 μm from the surface of the steel sheet in the thickness direction with an optical microscope at a magnification of 400×. In each of the fields of view, the maximum length of each prior austenite grain in the rolling direction is divided by the maximum length of the prior austenite grain in the thickness direction. The average value of the resulting quotients for all the grains is calculated and is used as the aspect ratio of the prior austenite grains.

The area percentage of retained austenite is determined as follows: An annealed steel sheet is ground to a depth of ¼ of the thickness of the sheet and then further polished to a depth of 0.1 mm by chemical polishing. For the polished surface, the integrated intensities of reflections from the (200), (220), and (311) planes of fcc iron (austenite) and the (200), (211), and (220) planes of bcc iron (ferrite) are measured with an X-ray diffractometer using MoKα radiation. The volume percentage is determined from the intensity ratio of the integrated intensity of reflection from the planes of fcc iron to the integrated intensity of reflection from the planes of bcc iron. The value of the volume percentage is used as a value of the area percentage of retained austenite. Retained austenite and martensite are distinguishable from each other by calculating the area percentage of retained austenite in this manner.

Next, a method for producing a steel sheet according to the embodiment will be described. A steel sheet according to the embodiment is produced by subjecting a slab having the above-mentioned components to hot rolling, then cooling, and coiling at a temperature of 590° C. or lower to produce a hot-rolled steel sheet, subjecting the hot-rolled steel sheet to pickling, then performing heat treatment in an atmosphere in which $O_2 \leq 1\%$ by volume and $O_2/H_2 \leq 0.2$ under conditions where the maximum temperature reached is 400° C. to lower than 600° C. and where the maximum temperature reached $T_1$ (° C.) and the holding time t(s) satisfy formula (1) described below, then performing cold rolling at a rolling reduction of 20% or more, subsequently performing annealing that includes heating to a temperature in the temperature range of Ac3 to 950° C., holding for 10 to 600 s at a dew point of −35° C. to +20° C. in this temperature range, then cooling to 550° C. or lower at an average cooling rate of 3° C./s or more, and holding at 400° C. to 550° C. for 5 to 300 s, then performing hot-dip galvanizing treatment and, optionally, alloying treatment, and subsequently performing cooling to room temperature. Each temperature described in the production conditions is represented by the surface temperature of the steel sheet.

$$18{,}500 > (273 + T_1) \times \mathrm{Log}_{10}(t/3600) \quad (1)$$

where in formula (1), $T_1$ is the maximum temperature reached (° C.), and t is the holding time (s). t refers to the holding time in the temperature range of $T_1$ to $T_1 - 20°$ C.

In the cooling to room temperature after performing the hot-dip galvanizing treatment and, optionally, the alloying treatment after the annealing described above, the cooling is performed so as to satisfy formula (2) below.

[Math. 2]

$$\sum_{T_2=50}^{Ms} \sqrt{\frac{0.004 \exp(-9862/(T_2+273))}{C}} < 5.0 \times 10^{-8} \quad (2)$$

In formula (2), $l_2$ is a temperature (° C.) in the range of 50° C. to an Ms temperature, and C is a cooling rate (° C./s) at $l_2$. The Ms temperature refers to a temperature at which martensite transformation starts and is determined with Formastor. Details will be described below.

Coiling Temperature: 590° C. or Lower

A coiling temperature of higher than 590° C. results in excessive internal oxidation to fail to obtain the C distribution at the surface layer of the steel sheet after annealing. Accordingly, the coiling temperature is 590° C. or lower. The lower limit of the temperature need not be specified, but is preferably 400° C. in view of shape stability.

Atmosphere: $O_2 \leq 1\%$ by Volume and $O_2/H_2 \leq 0.2$ (Ratio by Vol %)

In the heat treatment of the hot-rolled steel sheet, the atmosphere is controlled to contain oxygen at $O_2 \leq 1\%$ by volume and $O_2/H_2 \leq 0.2$ (ratio by vol %). This suppresses internal oxidation to obtain the distribution of the amount of C at the surface layer of the steel sheet after annealing. Accordingly, the atmosphere during the heat treatment of the hot-rolled steel sheet needs to be such that $O_2 \leq 1\%$ by volume and $O_2/H_2 \leq 0.2$. The remainder of the atmosphere, other than $O_2$ or $H_2$, is preferably $N_2$ or argon.

Maximum Temperature Reached of 400° C. to Lower Than 600° C. and Maximum Temperature Reached $T_1$ and Holding Time t: Satisfying Formula (1) Below $$18{,}500 > (273 + T_1) \times \mathrm{Log}_{10}(t/3600) \quad (1)$$

In formula (1), $T_1$ is the maximum temperature reached (° C.), and t is the holding time (s). t refers to the holding time in the temperature range of $T_1$ to $T_1 - 20°$ C.

In the heat treatment of the hot-rolled steel sheet, in the case where the maximum temperature reached is 600° C. or higher or where the right-hand side of formula (1) is 18,500 or more, cementite coarsens and remains undissolved after annealing, thereby increasing micro-variations in the amount of C. This leads to a failure to obtain a ratio of the standard deviation of the amount of C to the average amount of C in the steel sheet according to the embodiment of 0.40 or less. Accordingly, the maximum temperature reached needs to be lower than 600° C., and the maximum temperature reached $T_1$ and the holding time t need to satisfy formula (1). A maximum temperature reached of lower than 400° C. leads to insufficient temper softening of martensite formed in the hot-rolled steel sheet to result in an uneven strain distribution during cold rolling, thereby easily causing micro-variations in the amount of C. Accordingly, the maximum temperature reached needs to be 400° C. or higher.

Cold Rolling Reduction: 20% or More

A cold rolling reduction of less than 20% results in the formation of prior austenite grains elongated in the rolling direction, thereby failing to obtain the steel microstructure of the steel sheet according to the embodiment. Accordingly, the cold rolling reduction needs to be 20% or more. The cold rolling reduction is preferably 30% or more. The upper limit of the cold rolling reduction need not be specified, but is preferably 90% or less in view of shape stability and so forth.

Annealing Temperature: Ac3 to 950° C.

An annealing temperature of lower than Ac3 leads to insufficient formation of austenite, thereby failing to obtain the steel microstructure of the steel sheet according to the embodiment. Accordingly, the annealing temperature needs to be Ac3 or higher. An annealing temperature of higher than 950° C. results in nonuniform grain coarsening, thereby increasing variations in the amount of C. Accordingly, the annealing temperature needs to be 950° C. or lower.

Annealing Holding Time: 10 to 600 s

An annealing holding time of less than 10 s leads to insufficient formation of austenite, thereby failing to obtain the steel microstructure of the steel sheet according to the embodiment. Accordingly, the annealing holding time needs to be 10 s or more. The annealing holding time is preferably 20 s or more, more preferably 30 s or more. An annealing holding time is more than 600 s results in excessive internal oxidation, thereby failing to obtain the strength of the steel sheet and the distribution of the amount of C at the surface layer according to the embodiment. Accordingly, the annealing holding time needs to be 600 s or less. The annealing holding time is preferably 500 s or less, more preferably 400 s or less.

Dew Point at Annealing Temperature: −35° C. to +20° C.

A dew point during the annealing of lower than −35° C. leads to insufficient oxidation reaction of C at the surface layer of the steel sheet, thereby failing to obtain the distribution of the amount of C at the surface layer of the steel sheet according to the embodiment. Accordingly, the dew point at the annealing temperature needs to be −35° C. or higher. A dew point of higher than +20° C. leads to excessive internal oxidation, thereby failing to obtain the strength of the steel sheet and the distribution of the amount of C at the surface layer according to the embodiment. Accordingly, the dew point at the annealing temperature needs to be +20° C. or lower. The dew point at the annealing temperature is preferably +15° C. or lower, more preferably +10° C. or lower.

Average Cooling Rate from Annealing Temperature to 550° C.: 3° C./s or More

When the average cooling rate from the annealing temperature to 550° C. is less than 3° C./s, ferrite is excessively formed, thereby failing to obtain the steel microstructure of the steel sheet according to the embodiment. Accordingly, the average cooling rate from the annealing temperature to 550° C. needs to be 3° C./s or more. The average cooling rate from the annealing temperature to 550° C. is preferably 5° C./s or more. The upper limit of the average cooling rate from the annealing temperature to 550° C. need not be specified, but is preferably less than 100° C./s in view of shape stability. The average cooling rate is calculated by dividing the temperature difference between the annealing temperature and 550° C. by the time required for cooling from the annealing temperature to 550° C.

Holding Temperature: 400° C. to 550° C.

A holding temperature of higher than 550° C. results in the formation of ferrite, thereby failing to obtain the steel microstructure of the steel sheet according to the embodiment. Accordingly, the holding temperature needs to be 550° C. or lower. At a holding temperature of lower than 400° C., the bainite transformation near the surface layer of the steel sheet proceeds excessively to fail to obtain the distribution of the amount of C at the surface layer of the steel sheet according to the embodiment. Accordingly, the holding temperature needs to be 400° C. or higher.

Holding Time at 400° C. to 550° C.: 5 to 300 s

Holding at 400° C. or higher and 550° C. or lower for 5 s or more causes the bainite transformation of the surface layer of the steel sheet to proceed, thereby obtaining the distribution of the amount of C at the surface layer of the steel sheet according to the embodiment. A holding time of less than 5 s is insufficient to achieve the effect, thereby failing to obtain the distribution of the amount of C at the surface layer of the steel sheet according to the embodiment. Accordingly, the holding time at 400° C. or higher and 550° C. or lower needs to be 5 s or more. The holding time at 400° C. or higher and 550° C. or lower is preferably 10 s or more. When the holding time at 400° C. or higher and 550° C. or lower is more than 300 s, bainite is excessively formed, thereby failing to obtain the steel microstructure of the steel sheet according to the embodiment. Accordingly, the holding time at 400° C. or higher and 550° C. or lower needs to be 300 s or less. The holding time at 400° C. or higher and 550° C. or lower is preferably 200 s or less, more preferably 120 s or less. During the holding, the temperature need not be constant as long as it is in the range of 400° C. to 550° C., and cooling or heating may be performed.

Cooling Condition After Alloying Treatment: Satisfying Formula (2)

[Math. 3]

$$\sum_{T_2=50}^{Ms} \sqrt{\frac{0.004\exp(-9862/(T_2+273))}{C}} < 5.0 \times 10^{-8} \quad (2)$$

In formula (2) described above, $T_2$ is a temperature (° C.) in the range of 50° C. to an Ms temperature, and C is a cooling rate (° C./s) at $1_2$. In calculating the left-hand side of formula (2), calculation is performed at $1_2$=50, 51, 52, . . . , up to the Ms temperature individually, and the sum of them is calculated.

After the alloying treatment, the cooling under the conditions that satisfy formula (2) described above can further suppress the variations in the amount of C.

Accordingly, $1_2$ and C in the cooling after the alloying treatment preferably satisfy formula (2) described above.

Other production conditions are not particularly limited. For example, the following conditions may be used. The slab is preferably produced by a continuous casting process in order to prevent macrosegregation. However, the slab may be produced by an ingot-making process or a thin slab casting process. To hot-rolling the slab, the slab may be temporarily cooled to room temperature and reheated before hot rolling. The slab may be transferred into a heating furnace without cooling to room temperature, and then hot-rolled. An energy-saving process may be employed in which the slab is slightly held at a temperature for a short time and then immediately hot-rolled. In the case of heating the slab, heating is preferably performed in such a manner that the slab temperature is 1,100° C. or higher and 1,300° C. or lower. Heating the slab to temperature of 1,100° C. or higher can dissolve carbides to suppress an increase in rolling load. A slab temperature of 1,300° C. or lower results in suppression of an increase in the amount of scale loss. The slab temperature is represented by the temperature of the slab surface.

In the case of hot-rolling the slab, a rough-rolled bar obtained by rough rolling may be heated. A continuous rolling process may be employed in which rough-rolled bars are joined to one another and continuously subjected to finish hot rolling. In the hot rolling, for the purposes of reducing the rolling load and providing a uniform shape and a uniform quality, it is preferable to perform lubrication rolling, in which the coefficient of friction is 0.10 to 0.25, in some or all passes of the finish hot rolling.

The steel sheet that has been coiled is then subjected to pickling or the like to remove scales. Then the steel sheet is subjected to cold rolling, annealing, and hot-dip galvanization. After the galvanization, the steel sheet is cooled to room temperature and then preferably subjected to temper rolling at an elongation of 1% or less in order to control the surface and the yield strength (YS). Although tempering treatment can further be performed as needed, the temperature is preferably 200° C. or lower. To adjust the shape and YS, leveling may be performed.

Examples

Aspects of the present invention will be specifically described below by examples. Molten steels (the balance being Fe and incidental impurities) were produced in a vacuum melting furnace in the laboratory and then hot-rolled into steel slabs. Table 1 presents the component compositions of the steels.

These steel slabs were heated to 1,250° C. and then subjected to rough rolling and hot rolling. The resulting hot-rolled steel sheets were subjected to heat treatment. Subsequently, the steel sheets were cold-rolled to a thickness of 1.4 mm to form cold-rolled steel sheets. The resulting cold-rolled steel sheets were subjected to annealing. Hot-dip galvanized steel sheets (GI) and hot-dip galvannealed steel sheets (GA) 1 to 33 were produced through annealing by a heat-treating and by using coating apparatus in the laboratory. Each of the hot-dip galvanized steel sheets was produced by immersion in a coating bath with a temperature of 465° C. to form a coated layer on each surface of the steel sheet at a coating weight of 40 to 60 g/m² per side. Each of the hot-dip galvannealed steel sheets was produced by, after the above-mentioned coating, performing alloying treatment including holding at 540° C. for 1 to 60 s. After the coating treatment, the steel sheets were cooled to room temperature and then subjected to temper rolling at an elongation of 0.1%. Some of the steel sheets were further subjected to tempering heat treatment. Table 2 presents the production conditions of the hot-dip galvanized steel sheets and the hot-dip galvannealed steel sheets.

TABLE 1

| Steel | Component composition (% by mass) | | | | | | | Ac3 transformation point (° C.) | Remarks |
|---|---|---|---|---|---|---|---|---|---|
| | C | Si | Mn | P | S | Al | Others | | |
| A | 0.16 | 2.0 | 3.5 | 0.010 | 0.0030 | 0.03 | — | 862 | within scope of invention |
| B | 0.20 | 1.5 | 3.5 | 0.010 | 0.0030 | 0.03 | Ti: 0.020 | 831 | within scope of invention |
| C | 0.24 | 1.0 | 3.5 | 0.010 | 0.0020 | 0.03 | Nb: 0.020 | 801 | within scope of invention |
| D | 0.28 | 0.8 | 3.5 | 0.010 | 0.0010 | 0.03 | V: 0.10 | 784 | within scope of invention |
| E | 0.32 | 0.6 | 3.5 | 0.010 | 0.0010 | 0.03 | Mo: 0.20 | 773 | within scope of invention |
| F | 0.13 | 0.3 | 3.5 | 0.010 | 0.0010 | 0.03 | Cr: 0.5 | 787 | within scope of invention |
| G | 0.20 | 0.6 | 2.5 | 0.010 | 0.0010 | 0.03 | Ni: 0.5, Cu: 0.5 | 814 | within scope of invention |
| H | 0.20 | 0.6 | 3.5 | 0.010 | 0.0005 | 0.03 | B: 0.0030 | 791 | within scope of invention |
| I | 0.20 | 0.6 | 3.5 | 0.010 | 0.0005 | 0.30 | Ca: 0.0010 | 791 | within scope of invention |
| J | 0.20 | 0.6 | 3.0 | 0.010 | 0.0005 | 0.03 | REM: 0.0020 | 806 | within scope of invention |
| K | 0.20 | 0.6 | 3.0 | 0.010 | 0.0010 | 0.03 | Sn: 0.010 | 806 | within scope of invention |
| L | 0.20 | 1.3 | 3.0 | 0.010 | 0.0010 | 0.03 | Sb: 0.005 | 838 | within scope of invention |
| M | 0.11 | 1.3 | 3.5 | 0.010 | 0.0010 | 0.03 | — | 841 | outside scope of invention |
| N | 0.36 | 1.3 | 3.0 | 0.010 | 0.0010 | 0.03 | — | 805 | outside scope of invention |
| O | 0.20 | 3.5 | 3.0 | 0.010 | 0.0010 | 0.03 | — | 936 | outside scope of invention |
| P | 0.20 | 1.3 | 1.8 | 0.010 | 0.0010 | 0.03 | — | 874 | outside scope of invention |
| Q | 0.20 | 1.3 | 4.5 | 0.010 | 0.0010 | 0.03 | — | 793 | outside scope of invention |

TABLE 2

| Steel sheet No. | Steel | Hot rolling condition Coiling temperature (° C.) | Heat treatment conditions for hot-rolled steel sheet Maximum temperature reached (° C.) | Holding time (s) | (273 + T) × Log₁₀(t/3600) | O₂ (% by volume) | O₂/H₂ | Cold rolling condition Cold rolling reduction (%) | Annealing conditions Annealing temperature (° C.) | Annealing time (s) | Dew point (° C.) |
|---|---|---|---|---|---|---|---|---|---|---|---|
| 1 | A | 500 | 500 | 14400 | 15925 | 0.10 | 0.02 | 50 | 900 | 100 | 10 |
| 2 |   | 620 | 500 | 14400 | 15925 | 0.10 | 0.02 | 50 | 900 | 100 | 10 |
| 3 |   | 500 | 620 | 14400 | 18398 | 0.10 | 0.02 | 50 | 900 | 100 | 10 |
| 4 | B | 400 | 500 | 14400 | 15925 | 0.10 | 0.02 | 50 | 850 | 200 | 0 |
| 5 |   | 400 | 200 | 14400 | 9745 | 0.10 | 0.02 | 50 | 850 | 200 | 0 |
| 6 |   | 400 | 580 | 259200 | 18644 | 0.10 | 0.02 | 50 | 850 | 200 | 0 |
| 7 | C | 580 | 580 | 14400 | 17574 | 0.10 | 0.02 | 50 | 850 | 200 | -10 |
| 8 |   | 580 | 580 | 14400 | 17574 | 1.50 | 0.15 | 50 | 850 | 200 | -10 |
| 9 |   | 580 | 580 | 14400 | 17574 | 0.50 | 0.50 | 50 | 850 | 200 | -10 |
| 10 | D | 550 | 550 | 14400 | 16955 | 0.10 | 0.02 | 50 | 900 | 30 | -30 |
| 11 |   | 550 | 550 | 14400 | 16955 | 0.10 | 0.02 | 15 | 900 | 30 | -30 |
| 12 |   | 550 | 550 | 14400 | 16955 | 0.10 | 0.02 | 50 | 990 | 30 | -30 |
| 13 | E | 500 | 450 | 14400 | 14895 | 0.10 | 0.02 | 50 | 800 | 480 | -10 |
| 14 |   | 500 | 450 | 14400 | 14895 | 0.10 | 0.02 | 50 | 750 | 480 | -10 |
| 15 |   | 500 | 450 | 14400 | 14895 | 0.10 | 0.02 | 50 | 800 | 3 | -10 |
| 16 | F | 500 | 400 | 14400 | 13865 | 0.10 | 0.02 | 50 | 850 | 50 | -20 |
| 17 |   | 500 | 400 | 14400 | 13865 | 0.10 | 0.02 | 50 | 850 | 900 | -20 |
| 18 |   | 500 | 400 | 14400 | 13865 | 0.10 | 0.02 | 50 | 850 | 50 | -40 |
| 19 | G | 500 | 500 | 14400 | 15925 | 0.10 | 0.02 | 50 | 850 | 200 | -10 |
| 20 |   | 500 | 500 | 14400 | 15925 | 0.10 | 0.02 | 50 | 850 | 200 | 25 |
| 21 |   | 500 | 500 | 14400 | 15925 | 0.10 | 0.02 | 50 | 850 | 200 | -10 |
| 22 | H | 500 | 500 | 14400 | 15925 | 0.10 | 0.02 | 50 | 850 | 200 | -15 |
| 23 |   | 500 | 500 | 14400 | 15925 | 0.10 | 0.02 | 50 | 850 | 200 | -15 |
| 24 |   | 500 | 500 | 14400 | 15925 | 0.10 | 0.02 | 50 | 850 | 200 | -15 |
| 25 | I | 500 | 500 | 14400 | 15925 | 0.10 | 0.02 | 50 | 850 | 200 | -25 |
| 26 | J | 500 | 500 | 14400 | 15925 | 0.10 | 0.02 | 50 | 850 | 200 | -10 |
| 27 | K | 500 | 500 | 14400 | 15925 | 0.10 | 0.02 | 50 | 850 | 200 | -10 |
| 28 | L | 500 | 500 | 14400 | 15925 | 0.10 | 0.02 | 50 | 850 | 200 | -10 |
| 29 | M | 500 | 500 | 14400 | 15925 | 0.10 | 0.02 | 50 | 900 | 200 | -10 |
| 30 | N | 500 | 500 | 14400 | 15925 | 0.10 | 0.02 | 50 | 850 | 200 | -10 |
| 31 | O | 500 | 500 | 14400 | 15925 | 0.10 | 0.02 | 50 | 940 | 200 | -10 |
| 32 | P | 500 | 500 | 14400 | 15925 | 0.10 | 0.02 | 50 | 900 | 200 | -10 |
| 33 | Q | 500 | 500 | 14400 | 15925 | 0.10 | 0.02 | 50 | 850 | 200 | -10 |

| Steel sheet No. | Annealing conditions Average cooling rate *1 (° C./s) | Cooling stop temperature (° C.) | Reheating temperature (° C.) | Holding time *2 (s) | Galvannealing | Value of formula (2) in final cooling ×10⁻⁸ | Tempering temperature (° C.) | Tempering time (s) | Ms (° C.) | Remarks |
|---|---|---|---|---|---|---|---|---|---|---|
| 1 | 100 | 500 | — | 100 | yes | 5.5 | — | — | 350 | Example |
| 2 | 100 | 500 | — | 100 | yes | 5.5 | — | — | 350 | Comparative example |
| 3 | 100 | 500 | — | 100 | yes | 5.5 | — | — | 350 | Comparative example |
| 4 | 20 | 550 | — | 10 | yes | 2.5 | — | — | 337 | Example |
| 5 | 20 | 550 | — | 10 | yes | 2.5 | — | — | 337 | Comparative example |
| 6 | 20 | 550 | — | 10 | yes | 2.5 | — | — | 337 | Comparative example |
| 7 | 20 | 500 | — | 50 | yes | 1.0 | — | — | 324 | Example |
| 8 | 20 | 500 | — | 50 | yes | 1.0 | — | — | 324 | Comparative example |
| 9 | 20 | 500 | — | 50 | yes | 1.0 | — | — | 324 | Comparative example |
| 10 | 10 | 450 | 500 | 20 | yes | 3.7 | — | — | 308 | Example |
| 11 | 10 | 450 | 500 | 20 | yes | 3.7 | — | — | 308 | Comparative example |
| 12 | 10 | 450 | 500 | 20 | yes | 3.7 | — | — | 308 | Comparative example |
| 13 | 20 | 500 | — | 200 | yes | 5.8 | 200 | 7200 | 293 | Example |
| 14 | 20 | 500 | — | 200 | yes | 5.8 | 200 | 7200 | 244 | Comparative example |
| 15 | 20 | 500 | — | 200 | yes | 5.8 | 200 | 7200 | 233 | Comparative example |
| 16 | 50 | 500 | — | 100 | no | 3.3 | — | — | 375 | Example |
| 17 | 50 | 500 | — | 100 | no | 3.3 | — | — | 375 | Comparative example |
| 18 | 50 | 500 | — | 100 | no | 3.3 | — | — | 375 | Comparative example |

TABLE 2-continued

| | | | | | | | | | | |
|---|---|---|---|---|---|---|---|---|---|---|
| 19 | 5 | 500 | — | 30 | yes | 4.5 | — | — | 374 | Example |
| 20 | 5 | 500 | — | 30 | yes | 4.5 | — | — | 374 | Comparative example |
| 21 | 2 | 500 | — | 30 | yes | 4.5 | — | — | 345 | Comparative example |
| 22 | 30 | 400 | 450 | 10 | yes | 4.5 | — | — | 344 | Example |
| 23 | 30 | 400 | 450 | 2 | yes | 4.5 | — | — | 344 | Comparative example |
| 24 | 30 | 400 | 450 | 600 | yes | 4.5 | — | — | 325 | Comparative example |
| 25 | 10 | 500 | — | 10 | yes | 4.5 | — | — | 344 | Example |
| 26 | 20 | 500 | — | 30 | yes | 4.5 | — | — | 359 | Example |
| 27 | 20 | 500 | — | 30 | yes | 4.5 | — | — | 359 | Example |
| 28 | 20 | 500 | — | 30 | yes | 4.5 | — | — | 353 | Example |
| 29 | 20 | 500 | — | 30 | yes | 4.5 | — | — | 350 | Comparative example |
| 30 | 20 | 500 | — | 30 | yes | 4.5 | — | — | 286 | Comparative example |
| 31 | 20 | 500 | — | 30 | yes | 4.5 | — | — | 321 | Comparative example |
| 32 | 20 | 500 | — | 30 | yes | 4.5 | — | — | 303 | Comparative example |
| 33 | 20 | 500 | — | 30 | yes | 4.5 | — | — | 308 | Comparative example |

*1 An average cooling rate from an annealing temperature to 550.
*2 A holding time at a cooling stop temperature. A holding time at a reheating temperature when reheating is performed.

The tensile properties and the edge cracking resistance of the resulting hot-dip galvanized steel sheets and the hot-dip galvannealed steel sheets were evaluated according to the following testing methods.

<Tensile Test>

Japan Industrial Standard (JIS) No. 5 tensile test pieces (JIS Z2201:1998) were taken from the annealed steel sheets in a direction perpendicular to the rolling direction. A tensile test was performed according to Japan Industrial Standard (JIS) Z 2241:2011 at a strain rate of $10^{-3}$/s, thereby determining TS. In the Examples, a tensile strength (TS) of 1,300 MPa or more was evaluated as acceptable.

<Edge Cracking Resistance>

A test piece having a width of 30 mm and a length of 110 mm was taken from each of the steel sheets, the width direction being parallel to the rolling direction. Here, one of the 110 mm sections was a polished edge surface, and the other section was a sheared edge surface. The sheared edge surface was formed by shearing at a shear angle of 2°, a clearance of 15%, and a radius of curvature of a shearing blade of 0.2 mm or less. The test piece was subjected to 90° V-bending at a bending radius of 7 mm in such a manner that the ridge line was parallel to the rolling direction and was outside the burr. The test piece was tightened with a bolt in such a manner that the apex portion of a bend had a tensile stress of 1,000 MPa. The test piece was immersed in a hydrochloric acid with a pH of 3. After holding for 24 hours, the test piece was examined for cracks. In the Examples, the edge cracking resistance of a test piece having no crack with a length of 1 mm or more extending from the edge surface was evaluated as acceptable. The edge cracking resistance of a test piece having a crack with a length of 0.5 mm or more and less than 1 mm extending from the edge surface was rated "○". The edge cracking resistance of a test piece having a crack with a length of less than 0.5 mm was rated "⊙". The edge cracking resistance of a test piece having a crack extending over the entire width was rated "x". The edge cracking resistance of a test piece having a crack with a length of 1 mm or more extending from the edge surface and not extending over the entire width was rated "Δ".

The steel microstructure of each steel sheet, the aspect ratio of the prior austenite grains, the ratio of the average amount of C at a position 5 μm from the surface layer of the steel sheet to the average amount of C at a position 70 μm from the surface layer of the steel sheet in the thickness direction, and the ratio of the standard deviation of the amount of C to the average amount of C when analysis is performed with an FE-EPMA in a region extending from a position 300 μm to a position 400 μm from the surface layer of the steel sheet in the thickness direction were measured by the above-described methods. Table 3 presents these evaluation results, the steel microstructure of the steel sheet, and so forth.

TABLE 3

| Steel sheet No. | Steel microstructure | | | | | | Tensile property value TS (MPa) | Edge cracking resistance | Remarks |
|---|---|---|---|---|---|---|---|---|---|
| | V(H)*1 (%) | V(γ)*2 (%) | V(O)*3 (%) | Average aspect ratio of prior γ particles (%) | C ratio *4 | σ(C)/C *5 | | | |
| 1 | 96 | 4 | 0 | 1.3 | 0.72 | 0.35 | 1502 | ○ | Example |
| 2 | 97 | 3 | 0 | 1.4 | 0.82 | 0.36 | 1492 | Δ | Comparative example |
| 3 | 97 | 3 | 0 | 1.2 | 0.71 | 0.42 | 1499 | X | Comparative example |
| 4 | 95 | 4 | 1 | 1.2 | 0.45 | 0.29 | 1574 | ⊙ | Example |
| 5 | 94 | 5 | 1 | 1.3 | 0.50 | 0.41 | 1583 | Δ | Comparative example |

TABLE 3-continued

| Steel sheet No. | Steel microstructure V(H)*1 (%) | V(γ)*2 (%) | V(O)*3 (%) | Average aspect ratio of prior γ particles (%) | C ratio *4 | σ(C)/C *5 | Tensile property value TS (MPa) | Edge cracking resistance | Remarks |
|---|---|---|---|---|---|---|---|---|---|
| 6 | 94 | 5 | 1 | 1.5 | 0.47 | 0.41 | 1582 | Δ | Comparative example |
| 7 | 96 | 4 | 0 | 1.4 | 0.48 | 0.25 | 1647 | ⊙ | Example |
| 8 | 95 | 5 | 0 | 1.5 | 0.84 | 0.26 | 1598 | Δ | Comparative example |
| 9 | 96 | 4 | 0 | 1.3 | 0.81 | 0.25 | 1601 | Δ | Comparative example |
| 10 | 95 | 5 | 0 | 1.3 | 0.61 | 0.32 | 1748 | ⊙ | Example |
| 11 | 95 | 5 | 0 | 2.2 | 0.62 | 0.32 | 1753 | Δ | Comparative example |
| 12 | 96 | 4 | 0 | 1.1 | 0.62 | 0.42 | 1712 | X | Comparative example |
| 13 | 94 | 6 | 0 | 1.2 | 0.43 | 0.38 | 1750 | ○ | Example |
| 14 | 84 | 8 | 8 | 1.3 | 0.62 | 0.39 | 1785 | X | Comparative example |
| 15 | 81 | 8 | 11 | 1.3 | 0.64 | 0.38 | 1788 | X | Comparative example |
| 16 | 98 | 2 | 0 | 1.4 | 0.53 | 0.32 | 1321 | ⊙ | Example |
| 17 | 98 | 2 | 0 | 1.3 | 0.83 | 0.31 | 1302 | Δ | Comparative example |
| 18 | 98 | 2 | 0 | 1.4 | 0.81 | 0.31 | 1358 | Δ | Comparative example |
| 19 | 97 | 3 | 0 | 1.3 | 0.45 | 0.37 | 1436 | ○ | Example |
| 20 | 96 | 4 | 0 | 1.2 | 0.85 | 0.38 | 1403 | X | Comparative example |
| 21 | 86 | 3 | 11 | 1.5 | 0.37 | 0.37 | 1359 | Δ | Comparative example |
| 22 | 97 | 3 | 0 | 1.4 | 0.46 | 0.37 | 1585 | ○ | Example |
| 23 | 97 | 3 | 0 | 1.5 | 0.85 | 0.37 | 1598 | X | Comparative example |
| 24 | 85 | 3 | 12 | 1.3 | 0.63 | 0.36 | 1533 | Δ | Comparative example |
| 25 | 97 | 3 | 0 | 1.3 | 0.57 | 0.38 | 1485 | ○ | Example |
| 26 | 98 | 2 | 0 | 1.4 | 0.43 | 0.38 | 1435 | ○ | Example |
| 27 | 97 | 3 | 0 | 1.3 | 0.41 | 0.37 | 1435 | ○ | Example |
| 28 | 98 | 2 | 0 | 1.3 | 0.52 | 0.37 | 1505 | ○ | Example |
| 29 | 85 | 4 | 11 | 1.4 | 0.49 | 0.30 | 1280 | ⊙ | Comparative example |
| 30 | 94 | 6 | 0 | 1.3 | 0.37 | 0.39 | 1993 | X | Comparative example |
| 31 | 88 | 5 | 7 | 1.3 | 0.48 | 0.44 | 1724 | X | Comparative example |
| 32 | 66 | 8 | 26 | 1.2 | 0.45 | 0.45 | 1386 | X | Comparative example |
| 33 | 97 | 3 | 0 | 1.2 | 0.46 | 0.32 | 1653 | X | Comparative example |

*1V(H): The total area percentage of carbide-containing bainite and martensite.
*2V(γ): The area percentage of retained austenite.
*3V(O): The total area percentage of ferrite, carbide-free bainite, and pearlite.
*4 C Ratio: The ratio of the average amount of C at a position 5 μm from a surface layer of a steel sheet to the average amount of C at a position 70 μm from the surface layer of the steel sheet.
*5 σ(C)/C: The ratio of the standard deviation of the amount of C to the average amount of C when analysis is performed with an FE-EPMA in a region extending from a position 300 μm to a position 400 μm from the surface layer.

In the examples, high-strength galvanized steel sheets having a tensile strength (TS) of 1,300 MPa or more and excellent edge cracking resistance were produced. In contrast, in the comparative examples outside the scope of the present invention, one or more of desired TS and edge cracking resistance were not obtained.

The invention claimed is:
1. A high-strength hot-dip galvanized steel sheet, comprising:
a hot-dip galvanized layer on a surface of the steel sheet;
a component composition containing, on a percent by mass basis:
C: 0.12% to 0.35%,
Si: 0.01% to 3.0%,
Mn: 2.0% to 4.0%,
P: 0.100% or less (excluding 0),
S: 0.02% or less (excluding 0), and
Al: 0.01% to 1.50%, the balance being Fe and incidental impurities; and
a steel microstructure containing, on an area percentage basis, 90% to 100% of martensite and carbide-containing bainite in total and 0% to 10% of retained austenite, and containing prior austenite grains having an aspect ratio of 2.0 or less, in a region extending from a position 300 μm to a position 400 μm from the surface layer of the steel sheet in a thickness direction,
wherein a ratio of an average amount of C at a position 5 μm from the surface layer of the steel sheet in the thickness direction to an average amount of C at a position 70 μm from the surface layer of the steel sheet in the thickness direction is 0.20 to 0.80, and
a ratio of a standard deviation of an amount of C to an average amount of C when analysis is performed with an FE-EPMA (Field Emission-Electron Probe Micro-Analyzer) in a region extending from a position 300 μm to a position 400 μm from the surface layer of the steel sheet in the thickness direction is 0.40 or less.

2. The high-strength hot-dip galvanized steel sheet according to claim 1, wherein the component composition further contains, on a percent by mass basis, one or more selected from the following groups A and B:

Group A:
One or more selected from:
  Ti: 0.005% to 0.20%,
  Nb: 0.005% to 0.20%,
  V: 0.005% to 2.0%, and
  Mo: 0.005% to 2.0%, Group B:
One or more selected from:
  Cr: 0.005% to 2.0%,
  Ni: 0.005% to 2.0%,
  Cu: 0.005% to 2.0%,
  B: 0.0002% to 0.0050%,
  Ca: 0.001% to 0.005%,
  a REM: 0.001% to 0.005%,
  Sn: 0.001% to 0.05%, and
  Sb: 0.001% to 0.05%.

3. The high-strength hot-dip galvanized steel sheet according to claim 1, wherein the hot-dip galvanized layer is a hot-dip galvannealed layer.

4. The high-strength hot-dip galvanized steel sheet according to claim 2, wherein the hot-dip galvanized layer is a hot-dip galvannealed layer.

5. A method for producing a high-strength hot-dip galvanized steel sheet, comprising subjecting a slab having the component composition according to claim 1 to hot rolling, then cooling, and coiling at a temperature of 590° C. or lower to produce a hot-rolled steel sheet, subjecting the hot-rolled steel sheet to pickling, then performing heat treatment in an atmosphere in which $O_2 \leq 1\%$ by volume and $O_2/H_2 \leq 0.2$ (ratio by vol %) under conditions where a maximum temperature reached is 400° C. to lower than 600° C. and where the maximum temperature reached and a holding time satisfy formula (1) described below, then performing cold rolling at a rolling reduction of 20% or more, subsequently performing annealing that includes heating to a temperature in a temperature range of Ac3 to 950° C., holding for 10 to 600 s at a dew point of −35° C. to +20° C. in this temperature range, then cooling to 550° C. at an average cooling rate of 3° C./s or more, and holding at 400° C. to 550° C. for 5 to 300 s, then performing hot-dip galvanizing treatment and, optionally, alloying treatment, and subsequently performing cooling to room temperature, $$18{,}500 > (273 + T_1) \times \mathrm{Log}_{10}(t/3600) \tag{1}$$

where in formula (1), $T_1$ is the maximum temperature reached (° C.), and t is the holding time(s).

6. A method for producing a high-strength hot-dip galvanized steel sheet, comprising subjecting a slab having the component composition according to claim 2 to hot rolling, then cooling, and coiling at a temperature of 590° C. or lower to produce a hot-rolled steel sheet, subjecting the hot-rolled steel sheet to pickling, then performing heat treatment in an atmosphere in which $O_2 \leq 1\%$ by volume and $O_2/H_2 \leq 0.2$ (ratio by vol %) under conditions where a maximum temperature reached is 400° C. to lower than 600° C. and where the maximum temperature reached and a holding time satisfy formula (1) described below, then performing cold rolling at a rolling reduction of 20% or more, subsequently performing annealing that includes heating to a temperature in a temperature range of Ac3 to 950° C., holding for 10 to 600 s at a dew point of −35° C. to +20° C. in this temperature range, then cooling to 550° C. at an average cooling rate of 3° C./s or more, and holding at 400° C. to 550° C. for 5 to 300 s, then performing hot-dip galvanizing treatment and, optionally, alloying treatment, and subsequently performing cooling to room temperature, $$18{,}500 > (273 + T_1) \times \mathrm{Log}_{10}(t/3600) \tag{1}$$

where in formula (1), $T_1$ is the maximum temperature reached (° C.), and t is the holding time(s).

7. The method for producing a high-strength hot-dip galvanized steel sheet according to claim 5, wherein in the cooling to room temperature after performing the hot-dip galvanizing treatment and, optionally, the alloying treatment, the cooling is performed so as to satisfy formula (2) below:

[Math. 1]

$$\sum_{T_2=50}^{Ms} \sqrt{\frac{0.004 \exp(-9862/(T_2 + 273))}{C}} < 5.0 \times 10^{-8} \tag{2}$$

where in formula (2), $T_2$ is a temperature (° C.) in a range of 50° C. to an Ms temperature, and C is a cooling rate (° C./s) at $T_2$.

8. The method for producing a high-strength hot-dip galvanized steel sheet according to claim 6, wherein in the cooling to room temperature after performing the hot-dip galvanizing treatment and, optionally, the alloying treatment, the cooling is performed so as to satisfy formula (2) below:

[Math. 1]

$$\sum_{T_2=50}^{Ms} \sqrt{\frac{0.004 \exp(-9862/(T_2 + 273))}{C}} < 5.0 \times 10^{-8} \tag{2}$$

where in formula (2), $T_2$ is a temperature (° C.) in a range of 50° C. to an Ms temperature, and C is a cooling rate (° C./s) at $T_2$.

* * * * *